US010970251B2

(12) United States Patent
Balasubramanian et al.

(10) Patent No.: US 10,970,251 B2
(45) Date of Patent: *Apr. 6, 2021

(54) MANAGING STORAGE SYSTEM METADATA DURING DATA MIGRATION (71) Applicant: International Business Machines Corporation, Armonk, NY (US)

(72) Inventors: Shankar Balasubramanian, Bangalore (IN); Manoj P. Naik, San Jose, CA (US); Venkateswara R. Puvvada, Inkollu (IN)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/381,020

(22) Filed: Apr. 11, 2019

(65) Prior Publication Data
US 2019/0236050 A1 Aug. 1, 2019

Related U.S. Application Data (63) Continuation of application No. 15/191,703, filed on Jun. 24, 2016, now Pat. No. 10,296,593.

(51) Int. Cl.
*G06F 16/11* (2019.01)
(52) U.S. Cl.
CPC .................. *G06F 16/119* (2019.01)
(58) Field of Classification Search
CPC .................................................. G06F 16/119
See application file for complete search history.

(56) References Cited

U.S. PATENT DOCUMENTS

| | | | |
|---|---|---|---|
| 10,545,698 B2* | 1/2020 | Hasegawa | G06F 3/0683 |
| 10,732,843 B2* | 8/2020 | Matsui | G06F 3/0682 |
| 2004/0049513 A1 | 3/2004 | Yakir et al. | |
| 2005/0021566 A1 | 1/2005 | Mu | |
| 2010/0332454 A1 | 12/2010 | Prahlad et al. | |
| 2011/0145502 A1 | 6/2011 | Joshi et al. | |
| 2011/0196829 A1 | 8/2011 | Vickrey et al. | |

(Continued)

OTHER PUBLICATIONS

Grace Period Disclosure, IBM, "Readme and Release notes for release 4.2.0.1 IBM Spectrum Scale 4.2.0.1 Spectrum_Scale_Advanced-4.2.0.1-x86_64-Linux Readme", Jan. 18, 2016. http://www-01.ibm.com/support/docview.wss?uid=isg400002478#Known Last accessed Jun. 23, 2016. 12:14 PM. 6 pages.

(Continued)

*Primary Examiner* — Richard L Bowen
(74) *Attorney, Agent, or Firm* — Daniel C. Housley (57) ABSTRACT

Data is migrated from a source storage device to a destination storage device using tape media. Both the source storage device and the destination storage device utilize disk drives to store data. A portion of data is detected migrating to the tape media. Metadata of the portion of data is changed to identify the portion of data as residing on the tape media. A prefetch command for the portion of data is detected. It is determined that the portion of data is stored on the tape media. In response to determining that the portion of data is stored on the tape media, the prefetch command is executing without recalling the portion of data to the disk drives. Instead, the portion of data is read directly from the tape media.

17 Claims, 3 Drawing Sheets

(56) References Cited

U.S. PATENT DOCUMENTS

| | | |
|---|---|---|
| 2012/0084524 A1 | 4/2012 | Gokhale et al. |
| 2012/0110279 A1* | 5/2012 | Fredricksen .......... G06F 16/119 711/154 |
| 2014/0181395 A1 | 6/2014 | Vincent et al. |
| 2014/0215145 A1 | 7/2014 | Ballard |
| 2015/0193353 A1 | 7/2015 | Habermann |
| 2015/0254257 A1 | 9/2015 | Kritchko et al. |
| 2015/0370505 A1 | 12/2015 | Shuma et al. |
| 2016/0225403 A1 | 8/2016 | Hostetter et al. |
| 2017/0097893 A1 | 4/2017 | Chakravarty |
| 2017/0371887 A1 | 12/2017 | Balasubramanian et al. |

OTHER PUBLICATIONS

Grace Period Disclosure, IBM, "IBM Spectrum Scale 4.2: Concepts, Planning and Installation Guide", Nov. 20, 2015. htttps://www.ibm.com/support/knowledgecenter/STXKQY_4.2.0/ibmspectrumscale42_content.html 248 pages.

Grace Period Disclosure, IBM, "IBM Spectrum Scale 4.2: Administration and Programming Reference", Nov. 20, 2015. https://www.ibm.com/support/knowledgecenter/STXKQY_4.2.0/ibmspectrumscale42_content.html 942 pages.

List of IBM Patents or Patent Applications Treated as Related, Apr. 9, 2019, 2 pages.

* cited by examiner

MANAGING STORAGE SYSTEM METADATA DURING DATA MIGRATION

STATEMENT REGARDING PRIOR DISCLOSURES BY THE INVENTOR OR A JOINT INVENTOR

The following disclosure(s) are submitted under 35 U.S.C. 102(b)(1)(A): International Business Machine Corporation product Spectrum Scale version 4.2.0.0 incorporated aspects of this disclosure on Nov. 20, 2015, and International Business Machine Corporation product Spectrum Scale version 4.2.0.1 incorporated aspects of this disclosure on Jan. 18, 2016.

BACKGROUND

Many large scale computer systems store data on external disk based storage systems. Large scale computer systems can contain petabytes of data. Often, in the process of upgrading a storage system or creating redundancy within a computer system, entities will acquire a new storage system to utilize in the computer system. To utilize the new storage system, the petabytes of data must be migrated to the new storage system.

SUMMARY

Embodiments of the disclosure provide a method, system, and computer program product for managing the metadata of storage systems during data migration. Data may be migrated from a source storage device to a destination storage device using tape media. Both the source storage device and the destination storage device utilize disk drives to store data. A portion of data is detected migrating to the tape media. The portion of data may be migrating from the source storage device to the tape media. Metadata of the portion of data may be changed to identify the portion of data as residing on the tape media. A prefetch command for the portion of data may be detected. It may be determined that the portion of data is stored on the tape media. The storage location of the portion of data may be determined using the metadata. In response to determining that the portion of data is stored on the tape media, the prefetch command is executing without recalling the portion of data to the disk drives. Instead, the portion of data may be read directly from the tape media.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to managing data recalls while migrating data to a new storage architecture. Often new storage architecture is added to a computer system with the intent of replacing old storage architecture. In this situation data is migrated from the old storage architecture to the new storage architecture with the use of tape media. To curtail recalls of data on tape through the disk, the protocol for prefetch commands are altered in regards to data on the tape media. Specifically, prefetch commands will not recall data on the tape media back through the disk of the old storage architecture. While the present disclosure is not necessarily limited to such applications, various aspects of the disclosure may be appreciated through a discussion of various examples using this context. Examples and example values discussed herein are provided by way of example only and are not to be construed as limiting.

In instances, a conventional computing system has a conventional storage component (e.g., a server that uses disks) to store the data of the conventional computing system. The conventional storage component may hold petabytes of data for the conventional computing system. To facilitate quick retrieval of data, especially regularly accessed data, prefetch commands may reference metadata on how to access said data on the conventional storage component. Conventional industry practice often includes conventional computing systems regularly (e.g., once every five years) replacing conventional storage components, whether for general maintenance or to take advantage of new technology. When a conventional storage component is therein reaching end of life (EOL), data of the old conventional storage component (e.g., source) is migrated to a new conventional storage component (e.g., destination). Part of the migration process may include the prefetch command "reading" data from the source to the destination, so that data may become resident (e.g., stored on the destination storage component) as soon as it is referenced.

In instances, data will be migrated from a conventional source to a conventional destination using tape media (e.g., a tape drive), such that at a given point in time up to 60-70% of the data of the conventional computer system may be on the tape media, for example. In such instances, the conventional computing system may use a prefetch command to recall data that is currently on the tape to the disk. Conventional computing systems, including their conventional storage components, may not have the ability to determine whether data is at the source, on the tape, or at the destination until said conventional computing systems (and their conventional storage components) go through the process of gathering/recalling said file. When the file is stored fully or partially on the tape, recalling this file from the tape to the disk may slow the migration process by requiring a relatively large amount of time. Additionally, in the middle of the migration process the disk may not even have sufficient disk storage to execute a recall from the tape to a disk, which may cause the process to fail. This failure may itself have other negative effects across the conventional computing system.

Aspects of the disclosure are directed towards managing the metadata of storage systems during data migration. Data may go through three stages in the course of migration: premigrated (e.g., when the data is on the source disk), migrated (e.g., when the data is on tape media), and resident (e.g., when the data is on the destination disk). In some embodiments the data may also undergo a migration with stubs stage (e.g., where the majority of data is on the tape media while stubs for identifying the data are filed on a disk). When data is premigrated, the data may be gathered, prefetched, or read into the destination disk as by conventional means. Reading data from a source disk to a destination disk may include reading a full file of data from the source disk for purposes of writing the file of data to the destination disk, and then reading the requested data from the destination disk. When data is fully resident onto the destination disk, the data may again be gathered conventionally. However, when data is migrated or migrated with stubs, the system may avoid recalling the data through a disk.

To avoid recalling the data, an alternate protocol for prefetch commands may be selected and therein followed. The protocol of the prefetch command (generically referred to herein as the prefetch protocol) is the procedure used to execute a prefetch command. Specifically, when executing a prefetch command, a storage system may reference storage metadata on the data to determine where the data is stored. Depending upon where the data is stored, the prefetch command may execute according to the default protocol and read data onto the destination disk or execute according to the alternate protocol and gather the data directly from where the data is stored, for example. Reading data onto the destination disk may include writing the data from the source disk to the destination disk and then reading the data from the destination disk. Accordingly, when the prefetch command attempts to prefetch a file and it is identified that the file is at least partially on tape media, a system may use the alternate prefetch protocol to ensure that the prefetch command will not recall said data through a disk.

Figure 1:
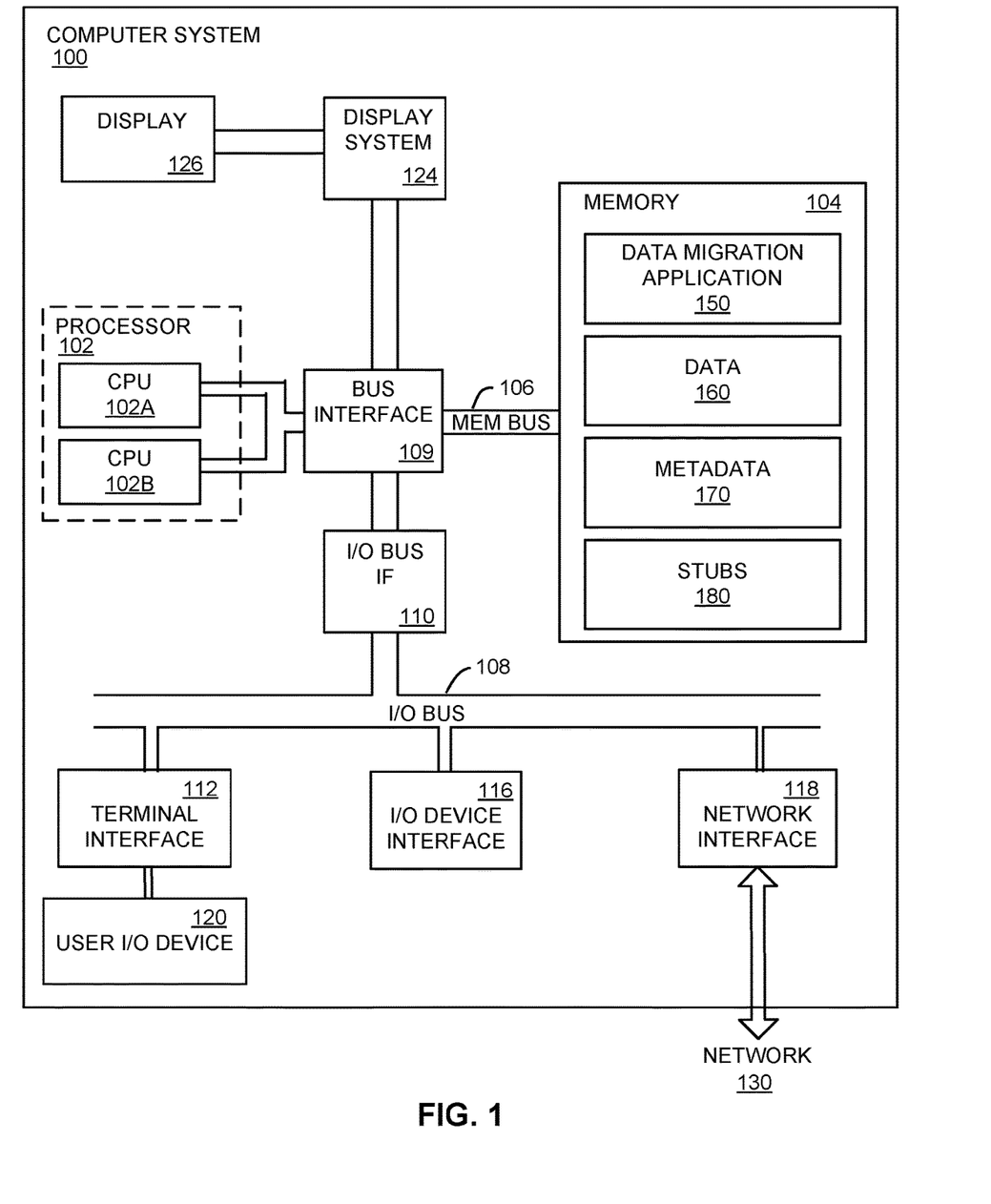
FIG. 1 is an apparatus for managing the metadata of storage systems during data migration, according to embodiments.

FIG. 1 depicts a high-level block diagram of a computer system 100 for managing the metadata of storage systems during data migration. The components of the various embodiments disclosed herein apply equally to any appropriate computing system. The components of the example computer system 100 shown in FIG. 1 include a memory 104, a terminal interface 112, an I/O (Input/Output) device interface 116, and a network interface 118, all of which are communicatively coupled, directly or indirectly, for inter-component communication via a memory bus 106, an I/O bus 108, a bus interface unit 109, and an I/O bus interface unit 110.

The computer system 100 includes one or more general-purpose programmable central processing units (CPUs) 102A and 102B, herein generically referred to as the processor or processors 102. In some embodiments, the computer system 100 may contain multiple processors. In other embodiments, the computer system 100 may alternatively be a single CPU system. Each processor 102 executes instructions—such as the instructions from the data migration application 150 to perform the acts described with respect to method 300—stored in the memory 104.

In some embodiments, the memory 104 may include a random-access semiconductor memory, storage device, or storage medium (either volatile or non-volatile) for storing or encoding data and programs. The memory 104 can store the data 160 that is being migrated as described herein. The data 160 may be migrated between two storage computers analogous to the computer system 100, where both storage computers are designed primarily for storage (e.g., the two storage computers are servers). The two storage computers may store the data 160 on a disk. The storage computers may also stores the stubs 180. In such an embodiment, the computer system 100 may use the metadata 170 or stubs 180 to access the data 160. The computer system 100 may access the data 160 in response to a request from an application on the network 100. In some embodiments, the data migration application 150, data 160, metadata 170, and/or stubs 180 may be stored in a series of analogous computer systems 100 connected over the network 130.

In certain embodiments, the memory 104 represents the entire virtual memory of the computer system 100, and may also include the virtual memory of other systems coupled to the computer system 100 or connected via a network 130. In such embodiments, portions of the data 160 may be stored in other systems of the network 130, such as during the process of data migration. For example, the data 160 may be on the tape media. During data migration, the data migration application 150 may use the metadata 170 and stubs 180 to access the data 160. The metadata 170 may include extra information (e.g., data location, data permissions, etc.) needed to find a respective portion of the data 160. Metadata 170 is used by prefetch commands to determine whether or not to read the data onto a destination disk. The stubs 180 may include information on the type of file of portions of data 160, wherein knowledge of the type of file may be necessary to properly access/utilize the respective portion of data 160.

In embodiments where a portion of the requested data 160 is not on the computer system 100 (e.g., the specific data 160 is stored on the tape media), the data migration application 150 will use the metadata 170 and/or stubs 180 to gather the requested data 160 directly from the location of the data rather than recalling the data. The data migration application 150 may gather the requested data 160 through the network interface 118.

The memory 104 may store all or a portion of the various programs, modules and data structures for managing the metadata of storage systems during data migration as discussed herein. For instance, the memory 104 can include the data migration application 150 that bars recalls of data 160 that are migrated from a source disk to a tape media. Likewise, if the data migration application detects that a first portion of the requested data 160 is on tape, the data migration application 150 will override/bar the recall even if a second portion of the requested data 160 is on a disk on a storage computer (e.g., if the requested data is in a migrated with stubs state).

In the depicted embodiment, the computer system 100 includes a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126, such as a standalone display screen, computer monitor, television, or a tablet or handheld device display. The display system 124 may include a dedicated memory for buffering video data.

In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may use such an I/O device 120 execute an action for an application stored within the memory 104 of the computer system 100, where the action opens or brings up a file of the data 160. In other embodiments, the user input may be entered on another computer system of the network 130, and the user input may be received by the data migration application 150 through the network interface 118. In response to such a user input, the data migration application 150 may determine whether or bring the data through a disk as described herein.

The I/O device interface 116 provides an interface to any of various other I/O devices or devices of other types, such as printers or fax machines. The network interface 118 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

FIG. 1 depicts several example components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
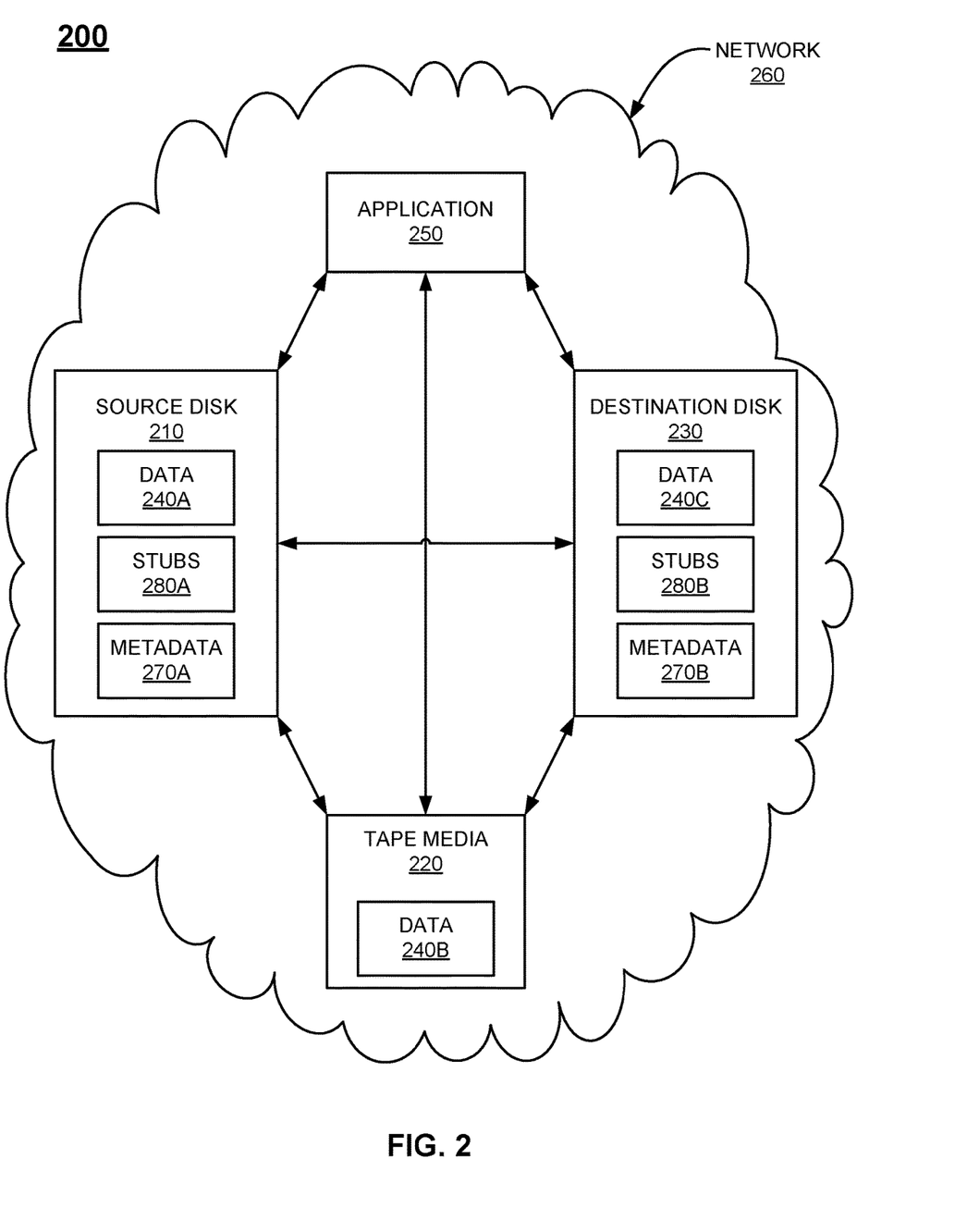
FIG. 2 is a depiction of a migration of data from a source storage system to a destination storage system using tape, according to embodiments.

FIG. 2 is a depiction of a migration of data 240A, 240B, 240C (referred to generically as data 240) within a computer architecture 200 from a source 210 to a destination 230 using tape media 230. The data 240 is used by an application 250. The application 250 may be hosted on a computer system analogous to the computer system 100 of FIG. 1. The data 240 of the system may be stored as a set of files, wherein each file includes a portion of data that is collectively referenced by the application 250. The source 210 and the destination 230 may both be storage systems. Both the source 210 and the destination 230 store data on disks. The migration from the source 210 to the destination 220 may make use of tape media 220 such as a tape drive. In some embodiments the tape media 220 may be on a server. The application 250, source 210, tape media 220, and destination 230 may all be connected over a network 260. The source disk 210 and destination disk 230 may store metadata 270A, 270B (referred to generically as metadata 270) to access the data 240. The metadata 270 may include information needed to access the data 240, such as the location of the data 240, permissions needed for the data 240, and other variables known to one skilled in the art. A prefetch command may use the metadata 270 to determine what to do (e.g., read the file onto the destination disk 230, gather the data 240 directly from where the data 240 is located, etc.).

Data 240 may be migrated from the source 210 to tapes 220 to the destination 230. Over the course of a complete migration, data 240 may also fluctuate back to a previous stage or skip a stage, such as going straight from the source 210 to the destination 230 or going from the tape 220 back to the source 210. Additionally, the application 250 may regularly create new data 240 on the source 210 until a cutover. The cutover may be a process that removes the source 210 from the architecture 200, as understood by one skilled in the art. Data 240A on the source 210 is referred to as premigrated data. Data 240B on the tapes 220 is referred to as migrated data. Data 240C on the destination 230 is referred to as resident data. As discussed, through the regular use of the application 250, new premigrated data 240A may be created on the source 210.

Some data 240 may also have stubs or stub information 280A, 280B (referred to generically herein as stubs 280). Stubs 280 include information that identify the type of file that holds the respective data 240. Not all data 240 will have respective stub information 280. However, a file that does have a respective stub 280 may be difficult or impossible to access without said stub. In some embodiments, migrated data 240B on the tapes 220 may have stubs 280A still on the source 210. Additionally, where data 240 has moved back from the destination 230 to tape 220, data 240B on the tapes 220 may have stubs 280B on the destination 230. Migrated data 240B with associated stubs 280 is referred to as migrated with stubs.

The application 250 may attempt to gather a file of data 240A on the source 210. A prefetch command may reference the metadata 270A and identify that the data 240A is premigrated. As a result of the data 240A being identified as premigrated, the prefetch command may then read the file into the destination 230. After being read into (e.g., stored at) the destination 230, the file is brought to the application 250. In this way individual files may be migrated from the source 210 to the destination 230 as the files are used. This procedure may have the added benefit of moving the most frequently referenced files to the destination 230 first, such that upon a cutover only the less frequently used data 240A remains upon the source 210, potentially lessening the impact of momentarily reducing the accessibility of data 240 during the final cutover migration.

During the migration process, some data 240B may be migrated to the tapes 220. The application 250 may attempt to gather this data 240B on the tapes 220 through the destination disk 230, whether by gathering the data directly from the destination disk 230 (e.g., where the data is resident) or by reading the data into the destination disk 230 (e.g., where the data is premigrated). A prefetch command may reference the metadata 270 and identify that the data 240B is on the tape media, and that therein gathering the data 240B through the destination disk 230 would result in a recall. Being as recalls are barred, the file of the tape 220 may instead be read straight to the application 250. Additionally, metadata on this migrated data 240B may be brought to the destination 230 in preparation for the final cutover.

During the migration process, some data 240B of the tape 220 may be migrated to the destination, where it is resident data 240C. The application 250 may use a prefetch command that references the metadata 270, determining that the data 240C is at the destination 230, and directly gather the data 240C. In this way an application 250 may avoid recalling data 240B that is on the tape 220.

Figure 3:
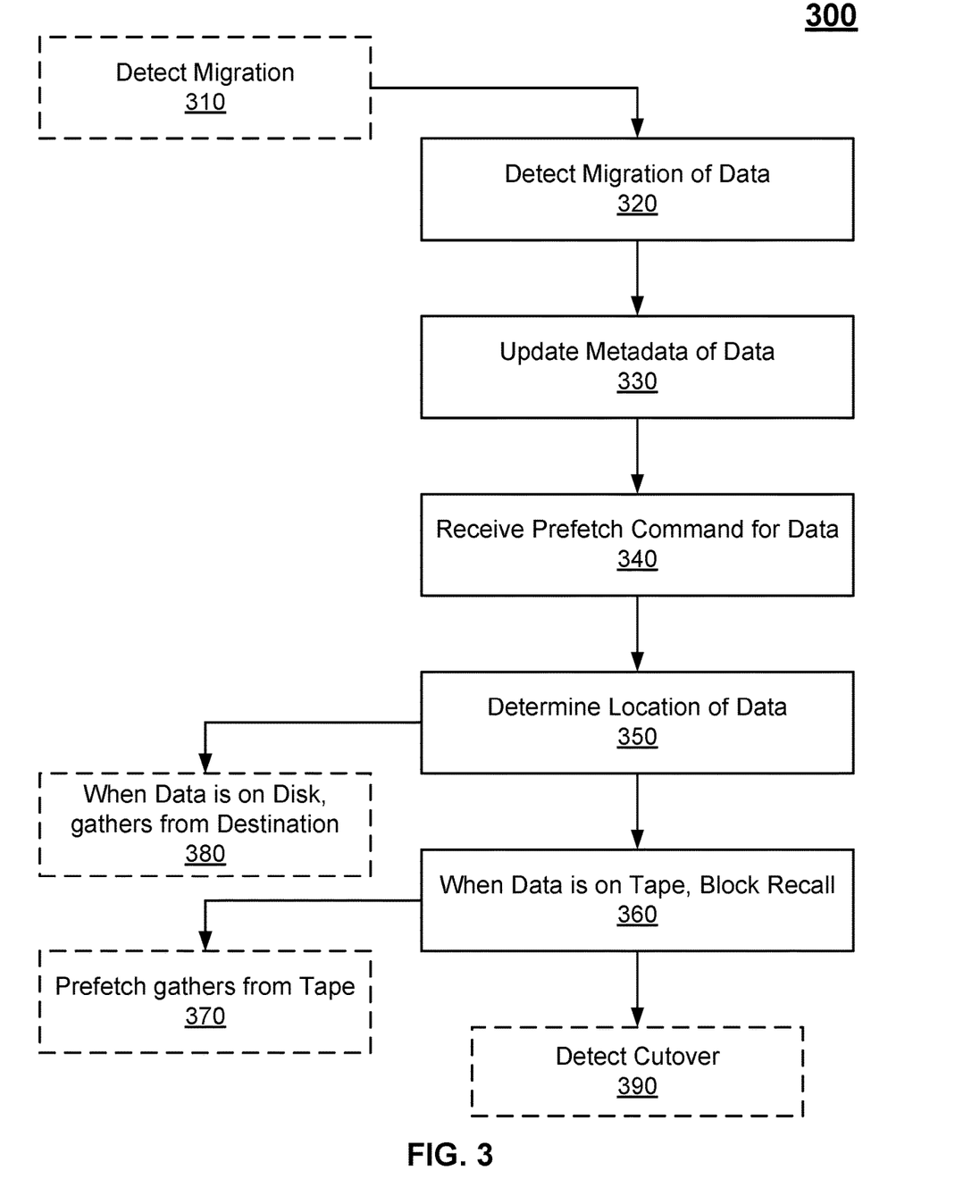
FIG. 3 is a method of managing the metadata of storage systems during data migration, according to embodiments.

FIG. 3 is a flowchart illustrating a method 300 for managing storage system metadata during data migration. Data may be migrated from a source disk-based storage system to a destination disk-based storage system. The storage systems may be analogous to the computer system 100 of FIG. 1. The migration make use of tape media. The tape media may be on a storage server analogous to the computer system 100 of FIG. 1. The source disk-based storage system, tape media, and destination disk-based storage system may be analogous to the source 210, tape 220, and destination 230 of FIG. 2. Blocks with hashed lines in FIG. 3 are optional steps within method 300. The visual arrangement of blocks in the flowchart of FIG. 3 is not to be construed as limiting the order in which the individual acts/operations may be performed, as certain embodiments may perform the operations of FIG. 3 in alternative orders.

Method 300 may relate to using metadata to manage prefetch commands. The metadata may include a status of the data. The metadata may be initially (e.g., at the start of data migration) stored at the source disk. In some embodiments, prefetch commands gather a remote set of files from a network. In certain embodiments the set of files are being utilized or requested at the time of gathering by an application hosted on the network. This remote set of files are stored on a local cache (e.g., a cache that is local to the computer system that is hosting the application). Storing the remote set of files on a local cache may allow the files to be more readily referenced/modified by the application. Additionally, during a migration, prefetch commands may read data from the source disk onto a destination disk to aid the migration process. Reading data from a source disk onto a destination disk may include writing a file that was on the source disk onto the destination disk, and then reading the file from the destination disk. Files read onto the destination disk may thereafter be stored at the destination disk by the migration controller, having a status of "resident." In some cases, after files are written to the destination disk, they may be erased from the source disk.

At block 310 data migration may be detected. Data migration is the migration of data between two disk-based storage systems. Data may be migrated between the two systems with the use of tape media. The data migration may be detected with the installation of a second storage systems. Additionally, the data migration may be detected by receiving user input indicating data migration. In other embodiments, the data migration may be detected simply by a first migration of a file of the data from the source to the tape media or to the destination.

In some embodiments, prefetch commands may only reference metadata to determine a file status (e.g., a status of premigrated, migrated, or resident) in response to detecting the data migration. In such embodiments, when there is not an ongoing migration of data, a prefetch command relating to a file may only reference and/or gather such metadata as is necessary to create a local copy of the file for the hosted application. Put differently, in some embodiments the system may reference the file status to execute prefetch commands during data migration and execute prefetch commands without referencing file status when data is not being migrated. The ability to toggle between using metadata or not using metadata as described in method 300 in response to detecting a migration may have performance benefits.

At block 320 a migration of a portion of data is detected. The portion of data may be the entirety of a file. The migration may be from a source disk to a tape media or from tape media to a destination disk. During migration a significant amount (e.g., up to 60-70%) of the data of a system could be stored on tape media. The migration may be detected by a migration controller. The migration controller may be a component of an existing file management system, such as an Active File Management (AFM) system. The status changes of the data of the system may be detected as described herein.

In some embodiments where the migration was from a source disk to tape media, the portion of data migrated from the source disk to the tape may not be the entirety of a file. Instead, the portion of data may be the majority of a file, while a stub of the file as described herein remains behind at the source. In such embodiments, the file may have a status of "migrated with stubs."

At block 330 metadata for the portion of data is changed. The metadata may include the information needed to access the data, such as the locations, permissions, whether data is premigrated/migrated/resident, etc. Changing the metadata may include changing the status of the data to reflect the location of the file. For example, where the file was migrated from the source disk to the tape media, the metadata may be changed by updating the status of the file to "migrated" or "migrated with stubs." The metadata is changed in response to the portion of data being migrated.

At block 340 a prefetch command for the portion of data is detected. The migration controller may detect the prefetch command. The prefetch command may have originated from a request for the portion of data (e.g., file) from an application hosted on another computer connected through a network, as described in the discussion of FIG. 2. As discussed herein, in some embodiments the default protocol for a prefetch command is to read the file from the destination disk, whether or not the file is stored on the destination disk when the prefetch command is detected. For example, if the file is stored on the destination disk when the prefetch command is detected, the default protocol may include the migration controller directly reading the file from the destination disk. To continue the example, if the file is not stored on the destination disk when the prefetch command is detected (e.g., the file is on the source disk), the default protocol may include the migration controller writing the file from the source disk onto the destination disk, after which the migration controller may read the file from the destination disk.

At block 350 the location of the portion of data is determined. The location of the portion of data (e.g., file) is determined in response to receiving the prefetch request. The location of the file may be determined by the migration controller. The migration controller may determine the location of the file by referencing the metadata on the file. The metadata on the file may be on either the source disk or the destination disk. In some embodiments, when the file is stored on the tape media, the metadata for the file may be initially stored on the source disk.

When the portion of data is on the tape, a recall of the portion of data from the tape media to one of the disks is blocked at block 360. Blocking the recall may include blocking the portion of data being written to the source disk so that the portion of data may be read onto the destination disk. Put differently, in response to the migration controller determining that the file is migrated as indicated by the metadata, the migration controller may bar the recall of the file from the tape to the source disk, where the recall of the file from the tape to the source disk may have otherwise resulted such that the file could be read onto the destination disk. In some embodiments, the migration controller may still read metadata of the file onto the destination disk. The migration controller may read metadata of the file onto the destination disk even while the file remains on the tape media. The recall may be blocked as a result of an alternate prefetch protocol. The alternate prefetch protocol is different from the default prefetch protocol discussed herein. The migration controller may block the recall using the alternate prefetch protocol in response to determining that the portion of data is on the tape media.

At block 370 the prefetch command may gather the file directly from the tape. The prefetch command may gather the file directly from the tape as a result of the alternate prefetch protocol. Put differently, the prefetch command may gather (e.g., read) the file directly from the tape as a result of the migration controller selecting the alternate prefetch protocol in response to determining that the file is stored on the tape. As discussed above, the alternate prefetch protocol may include the metadata on the file being written to the destination disk. In instances where the file has stubs on the source disk, the alternate prefetch protocol may include gathering the stubs from the source disk along with the file from the tape. In some embodiments, the stubs may be written to the destination disk along with the metadata as part of the alternate prefetch protocol in such instances.

Alternatively, when the data is determined at block 350 to be on one of the disks, at block 380 the migration controller gathers the portion of data from the destination disk. For example, the portion of data may have migrated at 320 from the tape to the destination disk or from the source disk to the destination disk. Arriving at the destination disk may trigger the portion of data changing from a status of "migrated" or "premigrated" to "resident," respectively. In this example, the migration controller may read the resident data directly from the destination disk at which the data is stored. For another example, at block 320 the portion of data may be detected migrating from the tape media to the source disk, reverting to a status of premigrated. In this example, the migration controller may read the premigrated data onto the destination disk, at which point the migration controller may gather the data from the destination disk.

At block 390 a cutover is detected (e.g., the source disk is no longer in use). The migration controller may detect the cutover. In some embodiments, after a cutover is detected, the migration controller will not reference metadata for file status. In such embodiments, upon detecting a cutover, a prefetch command may result in a file being gathered through the destination disk even if the file is on the tape media after cutover.

The following paragraphs discuss an example embodiment of method 300 using a computer system with a storage server with general parallel file system (GPFS) technology which utilizes active file management (AFM). The computer system in this example includes one billion files comprising ten petabytes of data, where hundreds of millions of files are migrated to tape. The tape may be part of a Tivoli Storage Manager (TSM) server. The AFM may include a set of prefetch commands that keeps a local cache of files that are otherwise stored on a network. The GPFS computer system has the capability to manage metadata (e.g., the location/status of the files) using the migration controller discussed herein. The migration controller may be a component of the AFM system. In certain embodiments, the migration controller may not be a standalone component or software module, but may instead be a series of components/modules dispersed throughout the computer system. It is to be understood that the specific examples provided below are to be non-limiting as other embodiments consistent with the disclosure are also possible.

The computer system may be migrating data from a source disk cluster (e.g., a server with disk drives approaching end-of-life (EOL) that will be disconnected from the computer system) to a target/destination disk cluster (e.g., a server with disk drives that is receiving the data of the EOL server). During the course of this migration, some data is on tape media rather than on the source disk or on the destination disk. The migration controller may determine whether to use the "default" protocol for prefetch commands (e.g., a protocol that includes reading the respective file from the destination disk) or the "alternate" protocol for prefetch commands (e.g., a protocol that bars recalls through the source/destination disk for files that have some data on the tape media). Instead, the alternate protocol prefetch command will gather the data directly from the tape. Additionally, the prefetch commands may send metadata (e.g., the location, permissions, etc.) of the file to the destination disk. In some embodiments, the alternate prefetch command protocol is only used during the migration, such that when the source disk is disconnected prefetch commands will again gather/move files as done conventionally. In such embodiments, the migration controller will elect to start using the alternate protocol of the prefetch commands upon detecting that data is to be migrated from a source disk to the destination disk using tape media.

The prefetch command may identify whether or not data of a certain file is on the tape media through the use of metadata. The metadata may indicate whether or not a file is fully on the source disk (e.g., the file is premigrated), fully on the tape media (e.g., the file is migrated), mostly on the tape media with stubs on one of the disks (e.g., the file is migrated with stubs), or fully on the destination disk (e.g., the file is resident). When the prefetch command is set to prefetch a file identified as resident, the prefetch command will gather the file through the destination disk. When the prefetch command is set to prefetch a file identified as premigrated, the prefetch command will read the file into the destination disk, therein changing the file from premigrated to resident, and gather the file for the application. Reading the file into the destination disk may include deleting the file from the source disk. When the prefetch command is set to prefetch a file identified as migrated or migrated with stubs, the prefetch command will gather the file from the tape media or will gather the file from the tape and the stub from the disk, respectively. Additionally, in some embodiments, when the prefetch command is set to prefetch a file identified as migrated or migrated with stubs, the prefetch command may read metadata on the file into the destination disk to prepare for eventual cutover.

The metadata will be updated whenever the status of the file changes between premigrated, migrated, migrated with stubs, or resident. In some embodiments, many status changes may be directly detectable using existing commands and features of a conventional computer system. For example, when resident files undergo any change, when migrated files change to premigrated or resident, or when premigrated files change to migrated or resident, the computer system of this embodiment may use the diff tool using the "mmbackup" feature. The diff tool and its operation are known to one of skill in the art and are not discussed in more detail herein. The diff tool may be able to detect these changes. The migration controller may use the diff tool to detect these changes, and then record the new statuses in the metadata.

In some embodiments, some status changes may not be directly detectable using existing commands and features of a conventional computer system. For example, in some cases before a prefetch a file may change from migrated to premigrated and therein revert back to migrated after the prefetch. Conventional tools such as the diff tool may not capture instances such as these. In such instances, if the file is already in the cache of the prefetch command, the file may be used by the computer system. Those knowledgeable in the art will understand that accessing the file in this situation is acceptable since the described computer system can handle that the file is identified as premigrated on the prefetch cache even as it is migrated.

Alternatively, in instances where the status is premigrated and the file is not in the cache of the prefetch command, the computer system may verify the status of the file. This may include identifying files that are identified as premigrated and do not have data within the prefetch cache. The migration controller may then determine if any of these files are actually in the migrated status. The migration controller may determine if these files are in the migrated status by querying the location of these files. Specifically, the migration controller may query for conventional information such as data management application programming interface (DMAPI) information. If any of these files are actually in migrated status rather than premigrated status, the files should be gathered through the tape media using the prefetch command and said files should be set in the cache.

Additionally, the notion of stub files should be maintained in the metadata. This may include a prefetch on a migrated with stubs file recalling the stub through the respective disk while not recalling the rest of the file. The stub should be then cached. From this point the file may be addressed fully as a migrated file, with the cached stub used to fully reference/modify/utilize the file.

The functionality outlined in the discussions herein regarding FIG. 1, FIG. 2, and FIG. 3 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing the migration of data, the method comprising:
   detecting a first migration of a portion of data to a tape media, wherein the first migration occurs during a process of migrating data of a source storage device to a destination storage device, wherein both the source storage device and the destination storage device utilize one or more disk drives to store data;
   changing metadata of the portion of data in response to detecting the first migration, wherein the metadata indicates that the portion of data is stored on the tape media;
   detecting a first prefetch command for the portion of data;
   determining that the portion of data is stored on the tape media using the metadata;
   executing the first prefetch command by blocking a recall of the portion of data and reading the portion of data directly from the tape media in response to determining that the portion of data is stored on the tape media;
   detecting a cutover, wherein the cutover reduces access to the source storage device;
   detecting a second prefetch command for the portion of data; and
   executing the second prefetch command by writing the portion of data to the destination storage device and reading the portion of data from the destination storage device in response to the detection of the cutover.

2. The method of claim 1, further comprising:
   detecting a second migration of the portion of data from the tape media, wherein the second migration included the portion of data migrating from the tape media to the destination storage device;
   changing metadata of the portion of data in response to detecting the second migration, wherein the metadata indicates that the portion of data is on the destination storage device;
   detecting a second prefetch command for the portion of data;
   determining that the portion of data is on the destination storage device using the metadata; and
   executing the second prefetch command by reading the portion of data directly from the destination storage device in response to determining that the portion of data is stored on the destination storage device.

3. The method of claim 1, further comprising:
   detecting a second migration of the portion of data from the tape media, wherein the second migration included the portion of data migrating from the tape media to the source storage device;
   changing metadata of the portion of data in response to detecting the second migration, wherein the metadata indicates that the portion of data is on the source storage device;
   detecting a second prefetch command for the portion of data;
   determining that the portion of data is on the source storage device using the metadata; and
   executing the second prefetch command in response to determining that the portion of data is stored on the tape media, wherein executing the second prefetch command includes gathering the portion of data from the source storage device, writing the portion of data to the destination storage device, and reading the portion of data from the destination storage device.

4. The method of claim 3, further comprising changing metadata of the portion of data in response to executing the second prefetch command, wherein the metadata indicates that the portion of data is on the destination storage device.

5. The method of claim 1, wherein the changing metadata of the portion of data includes the metadata being stored on the source storage device, wherein metadata includes information about the portion of data that assists in accessing the portion of data.

6. The method of claim 5, wherein executing the first prefetch command further comprises writing metadata on the portion of data from the source storage device to the destination storage device.

7. A computer system comprising:
a source storage device comprising a first disk drive configured to store one or more data files;
a destination storage device comprising a second disk drive configured to store one or more data files;
a tape drive configured to store information; and
one or more processing circuits configured to:
  detect a first migration of a portion of data from the source storage device to the tape drive, wherein the first migration occurs during a process of migrating data files of the source storage device to the destination storage device;
  change metadata of the portion of data in response to detecting the first migration, wherein the metadata indicates that the portion of data is stored on the tape drive;
  detect a first prefetch command for the portion of data;
  determine that the portion of data is stored on the tape drive using the metadata;
  execute the first prefetch command by blocking a recall of the portion of data and reading the portion of data directly from the tape drive in response to determining that the portion of data is stored on the tape drive;
  detect a cutover, wherein the cutover reduces access to the source storage device within the computer system;
  detect a second prefetch command for the portion of data; and
  execute the second prefetch command by writing the portion of data to the destination storage device and reading the portion of data from the destination storage device in response to the detection of the cutover.

8. The computer system of claim 7, wherein the one or more processing circuits are further configured to:
  detect a second migration of the portion of data from the tape drive, wherein the second migration included the portion of data migrating from the tape drive to the destination storage device;
  change metadata of the portion of data in response to detecting the second migration, wherein the metadata indicates that the portion of data is on the destination storage device;
  detect a second prefetch command for the portion of data;
  determine that the portion of data is on the destination storage device using the metadata; and
  execute the second prefetch command by reading the portion of data directly from the destination storage device in response to determining that the portion of data is stored on the destination storage device.

9. The computer system of claim 7, wherein the one or more processing circuits are further configured to:

detect a second migration of the portion of data from the tape drive, wherein the second migration included the portion of data migrating from the tape drive to the source storage device;
changing metadata of the portion of data in response to detecting the second migration, wherein the metadata indicates that the portion of data is on the source storage device;
detecting a second prefetch command for the portion of data;
determining that the portion of data is on the source storage device using the metadata; and
executing the second prefetch command in response to determining that the portion of data is stored on the tape drive, wherein executing the second prefetch command includes gathering the portion of data from the source storage device, writing the portion of data to the destination storage device, and reading the portion of data from the destination storage device.

10. The computer system of claim 9, wherein the one or more processing circuits are configured to change metadata of the portion of data in response to executing the second prefetch command, wherein the metadata indicates that the portion of data is on the destination storage device.

11. The computer system of claim 7, wherein:
metadata that is changed in response to detecting the first migration is stored on the source storage device; and
metadata includes information about the portion of data that assists in accessing the portion of data.

12. The computer system of claim 11, wherein the one or more processing circuits are further configured to execute the first prefetch command by being further configured to write metadata on the portion of data from the source storage device to the destination storage device.

13. A computer program product for managing the migration of data, the computer program product disposed upon a computer readable storage medium, the computer program product comprising computer program instructions that, when executed by a computer processor of a computer, cause the computer to:
  detect a first migration of a portion of data from a source storage device to a tape media, wherein the source storage device utilized one or more disk drives to store the portion of data, wherein the first migration occurs during a process of migrating data of the source storage device to a destination storage device that utilizes one or more disk drives;
  change metadata of the portion of data in response to detecting the first migration, wherein the metadata indicates that the portion of data is stored on the tape media;
  detect a first prefetch command for the portion of data;
  determine that the portion of data is stored on the tape media using the metadata;
  execute the first prefetch command by blocking a recall of the portion of data and reading the portion of data directly from the tape media in response to determining that the portion of data is stored on the tape media;
  detect a cutover, wherein the cutover reduces access to the source storage device within the computer system;
  detect a second prefetch command for the portion of data; and
  execute the second prefetch command by writing the portion of data to the destination storage device and reading the portion of data from the destination storage device in response to the detection of the cutover.

14. The computer program product of claim 13, the computer program product further comprising instruction that, when executed by the computer processor, cause the computer to:
   detect a second migration of the portion of data from the tape media, wherein the second migration included the portion of data migrating from the tape media to the destination storage device;
   change metadata of the portion of data in response to detecting the second migration, wherein the metadata indicates that the portion of data is on the destination storage device;
   detect a second prefetch command for the portion of data;
   determine that the portion of data is on the destination storage device using the metadata; and
   execute the second prefetch command by reading the portion of data directly from the destination storage device in response to determining that the portion of data is stored on the destination storage device.

15. The computer program product of claim 13, the computer program product further comprising instruction that, when executed by the computer processor, cause the computer to:
   detect a second migration of the portion of data from the tape media, wherein the second migration included the portion of data migrating from the tape media to the source storage device;
   change metadata of the portion of data in response to detecting the second migration, wherein the metadata indicates that the portion of data is on the source storage device;
   detect a second prefetch command for the portion of data;
   determine that the portion of data is on the source storage device using the metadata; and
   execute the second prefetch command in response to determining that the portion of data is stored on the tape media, wherein executing the second prefetch command includes gathering the portion of data from the source storage device, writing the portion of data to the destination storage device, and reading the portion of data from the destination storage device.

16. The computer program product of claim 15, the computer program product further comprising instruction that, when executed by the computer processor, cause the computer to change metadata of the portion of data in response to executing the second prefetch command, wherein the metadata indicates that the portion of data is on the destination storage device.

17. The computer program product of claim 13, wherein:
   metadata that is changed in response to the first migration is stored on the source storage device;
   the metadata includes information about the portion of data that assists in accessing the portion of data; and
   the computer program product further comprises instructions for executing the first prefetch command that, when executed by the computer processor, cause the computer to write metadata on the portion of data from the source storage device to the destination storage device.

* * * * *